(12) United States Patent
Bakke et al.

(10) Patent No.: US 7,089,550 B2
(45) Date of Patent: Aug. 8, 2006

(54) METHOD AND SYSTEM FOR PERFORMING SW UPGRADE IN A REAL-TIME SYSTEM

(75) Inventors: Knut Bakke, His (NO); Odd Oyvind Johansen, Fevik (NO); Parastoo Mohagheghi, Grimstad (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 604 days.

(21) Appl. No.: 10/369,870

(22) Filed: Feb. 19, 2003

(65) Prior Publication Data

US 2003/0177486 A1    Sep. 18, 2003

(30) Foreign Application Priority Data

Mar. 13, 2002 (NO) .................................. 20021247

(51) Int. Cl.
*G06F 9/44* (2006.01)
(52) U.S. Cl. ....................................... 717/173; 717/178
(58) Field of Classification Search ................ 717/173, 717/178; 713/188, 187, 118, 200, 220, 201; 455/418, 414.1, 412.1, 410, 575.1, 550.1, 455/186.1; 709/206, 207, 219; 370/270; 380/270
See application file for complete search history.

(56) References Cited

U.S. PATENT DOCUMENTS

| | | | |
|---|---|---|---|
| 4,325,120 A * | 4/1982 | Colley et al. ............... | 711/202 |
| 4,982,430 A | 1/1991 | Frezza et al. | |
| 5,666,293 A * | 9/1997 | Metz et al. .................. | 709/220 |
| 5,778,440 A * | 7/1998 | Yiu et al. .................... | 711/154 |
| 5,970,226 A * | 10/1999 | Hoy et al. .................... | 714/25 |
| 6,009,497 A * | 12/1999 | Wells et al. ................. | 711/103 |
| 6,088,759 A * | 7/2000 | Hasbun et al. .............. | 711/103 |
| 6,128,695 A * | 10/2000 | Estakhri et al. ............. | 711/103 |
| 6,157,559 A * | 12/2000 | Yoo ............................ | 365/52 |
| 6,198,946 B1 * | 3/2001 | Shin et al. ................... | 455/561 |
| 6,385,770 B1 | 5/2002 | Sinander | |
| 6,606,660 B1 * | 8/2003 | Bowman-Amuah ......... | 709/227 |
| 6,609,128 B1 * | 8/2003 | Underwood ................. | 707/10 |
| 6,832,373 B1 * | 12/2004 | O'Neill ....................... | 717/171 |

* cited by examiner

Primary Examiner—Todd Ingberg

(57) ABSTRACT

A new method is disclosed, for upgrading the software in a real-time distributed software system comprising several processes running in parallell. The method involves a preparatory procedure in which the new software is installed. Then, the software is activated, the components ordered to save configuration data and transaction data in a database, whereupon the components are stopped. When the preparatory procedure is completed, a restart procedure is invoked. This involves selecting start level (full upgrade involving all components, or a partial upgrade concerning just one or a few components). The modules concerned are started from the new software version. On each start level a number of start phases are defined. These are sequential steps performed during the restart operation. Each module subscribes to a number of these phases. Some of the phases are defined as synchronisation points, here called service levels, which all modules have to arrive at before the process is allowed to commence. During this process, each module is given the responsibility of converting any configuration data or transaction data belonging to it, if needed. The conversion is done by reading the old data from the database mentioned above and converting said data to the format required by the new software.

6 Claims, 4 Drawing Sheets

METHOD AND SYSTEM FOR PERFORMING SW UPGRADE IN A REAL-TIME SYSTEM

CROSS-REFERENCE TO RELATED APPLICATIONS

This application claims the benefit of the filing date as provided by 35 U.S.C. 119 of Norwegian patent application number 2002 1247 filed on Mar. 13, 2002, the disclosure of which is incorporated herein by reference.

TECHNICAL FIELD

The present invention relates to the upgrade of distributed, real-time software systems consisting of several applications, here called modules, running in parallel. One or more of the application owns configuration data and/or data changed during transactions; data that shall survive a software upgrade. The invention is designed for a telecom system, but is applicable in similar software systems too.

TECHNICAL BACKGROUND

The main characteristics of real-time systems may be defined as:

Time constraints: The system response must be correct and in time. Here we consider soft real-time systems where missing a deadline does not generate an unacceptable failure.

Concurrency: Multiple simultaneous activities can take place. There are several threads of control running in parallel.

Non-functional requirements: Real-time systems have usually high non-functional requirements as performance, quality of service, robustness or capacity.

Distribution: Large systems are usually distributed among processors.

To complete start/restart/upgrade of a distributed system such that it is ready for normal operation, several dependencies between processes and clusters of processes should be resolved. Introducing synchronisation mechanisms solves this problem.

A typical example of the need of synchronization is access to a database controlled by a separate server process. The server process offering the database access is a common synchronization point for the client processes. The start/restart of the client can't complete until the database server process is up and running. Besides if the data must be converted when upgrading, the client processes should wait for data conversion as well to be finished before accessing data.

In a system with a layered structure, some services should be started or upgraded in lower layers before components in higher levels can be started.

The known solution to this problem is to develop an installation program responsible for moving and when needed converting configuration data and hereby avoid the need for synchronisation when upgrading. After running the installation program or scripts specified for installing the new version of the code, the system can start as in a case of normal start.

There are several disadvantages related to this method:

1. The centralised installation program needs to know of all changes in the data structures, and in detail how to convert it. This is in conflict with the principle of encapsulation in object-oriented development where an object should own its date and access to this data is done via methods offered by the object's interface.

2. The method does not reuse the already developed mechanisms for synchronisation of several processes and software modules during start and in run-time. Therefore extra cost for design and implementation is to be counted.

a) The scripts or installation programs cannot usually run in parallel. Thus it takes long time to restart the system when upgrading.

SUMMARY OF THE INVENTION

With this invention we aim at reducing the complexity during start, restart and SW upgrade. One object is to reuse the same patterns and mechanisms in all of these activities; except that for software upgrade there may be need to convert some data from an old format used in the old version of the code to the new format used in the new version. By applying the patterns described later in this document there will be no need for an activity in every delivery of a new release to go through the entire system and make scripts to reuse configuration data from the old version. This solution will also enable the possibility of restarting only the application (or part of it) that is changed when doing a SW upgrade.

According to the invention, upgrading the software in a real-time distributed system involves a preparatory procedure in which the new software is installed. Then, the software is activated, the components ordered to save configuration data and transaction data in a database, whereupon the components are stopped.

When the preparatory procedure is completed, a restart procedure is invoked. This involves selecting start level (full upgrade involving all components, or a partial upgrade concerning just one or a few components). The modules concerned are started from the new software version. On each start level a number of start phases are defined. These are sequential steps performed during the restart operation. Each module subscribes to a number of these phases. Some of the phases are defined as synchronization points, here called service levels, which all modules have to arrive at before the process is allowed to commence.

During this process, each module is given the responsibility of converting any configuration data or transaction data belonging to it, if needed. The conversion is done by reading the old data from the database mentioned above and converting said data to the format required by the new software.

However, the exact scope of the invention will appear from the appended patent claims.

BRIEF DESCRIPTION OF THE SEVERAL VIEW OF THE DRAWINGS

The invention will now be described in detail in reference to the appended drawings, where:

FIG. 1 gives a general overview of the concepts involved for synchronisation of start or restart procedures according to the invention.

DETAILED DESCRIPTION OF THE INVENTION

Definitions; Synchronisation During Start and Restart

Several processes running on separate processors must be started during start of a distributed system. The processes need to synchronise in many cases. To solve the problem, the start procedure is divided in a number of start levels and start phases.

A start level shows in which grade the system processes are involved during a start or restart. Several start levels are defined such as:
   Connection restart (involves a single process started for a mobile)
   Small local restart (involves all processes running on the same processor handling non-centralised functionality)
   Small restart (involves all processes on all the processors while traffic data is kept)
   Large restart (involves all processes on all the processors while traffic data is lost or deleted)
   Start (involves all process on all processors during start).

Each start level consists of a number of start phases. Introducing start phases is done in order to decompose start (or restart) into a well-ordered sequence of actions and for internal and external coordination between software modules running on the same process or between different processes.

Each start phase is identified by a numeric value (the start phase id). Different start phases are reserved for different types of processes based on the kind of functionality they are running. A number of start phases have been defined as synchronization points.

When the system is started (or restarted) by specifying a start level (either by the operator or the central logic in the system), all modules running on processes have the possibility to subscribe to a number of start phases. Which start phases they should subscribe to, is defined in a design rule and depends on the actions they should perform during start. For example creation of database tables should be done in start phases 101, 111 or 121. The first digit depends on the kind of process (temporary or persistent). The two last digits show the kind of action/actions allowed in this start phase.

Start phases are executed in an ascending order and hereby-synchronising actions and services in a distributed system. When a synchronisation point (identified by a start phase) is reached, the whole system is in a defined state known as a service level, where specified services are available.

Figure 1:
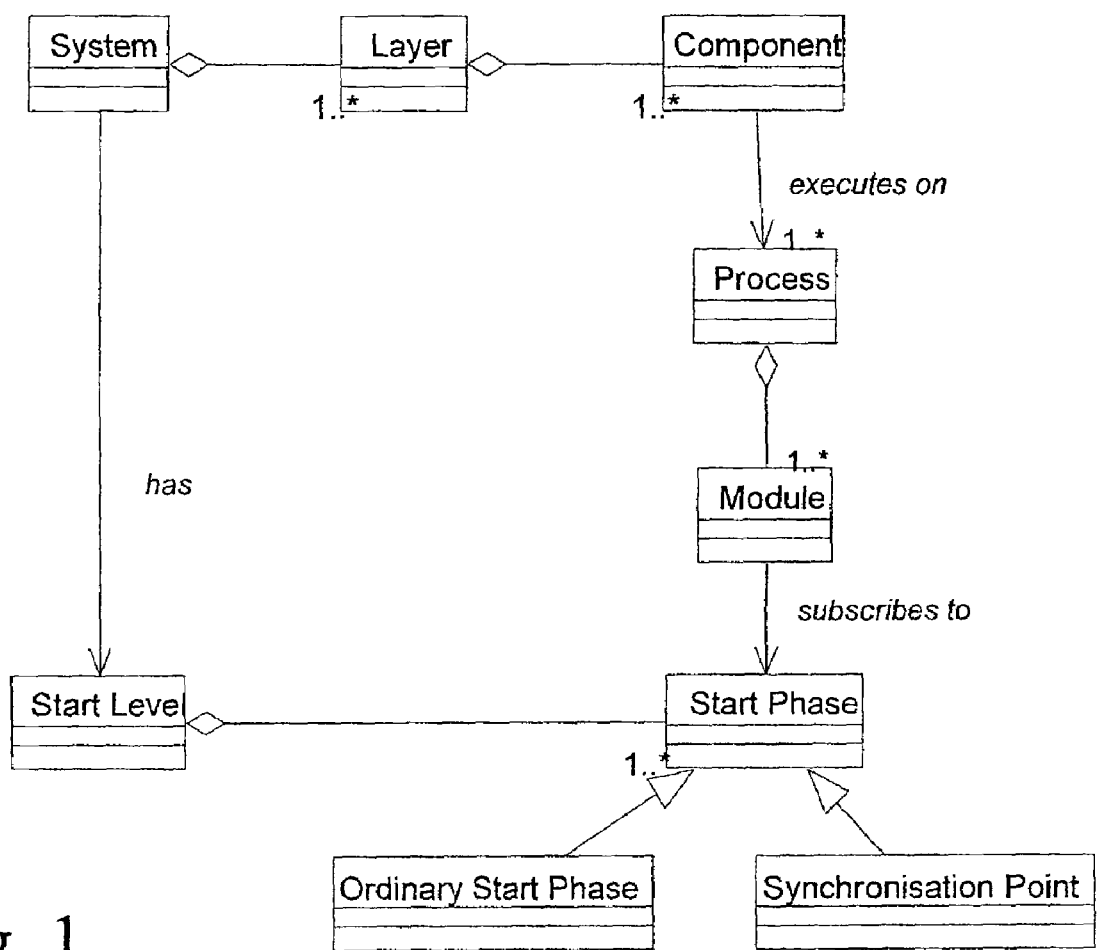

FIG. 1 summarises the above definitions.

Scenario for Software Upgrade

In the scenario described below, components have two types of data:
   Configuration data that is stored persistent in a database and is needed during starting or upgrading.
   Traffic data that is connected to the subscribers (the mobile systems in our case). This data is stored persistent for subscribers that are not active at the time a restart or upgrade takes place. Active subscribers may be in the middle of a transaction and should either save their data or stop the transaction to keep their data consistent.

Figure 2:
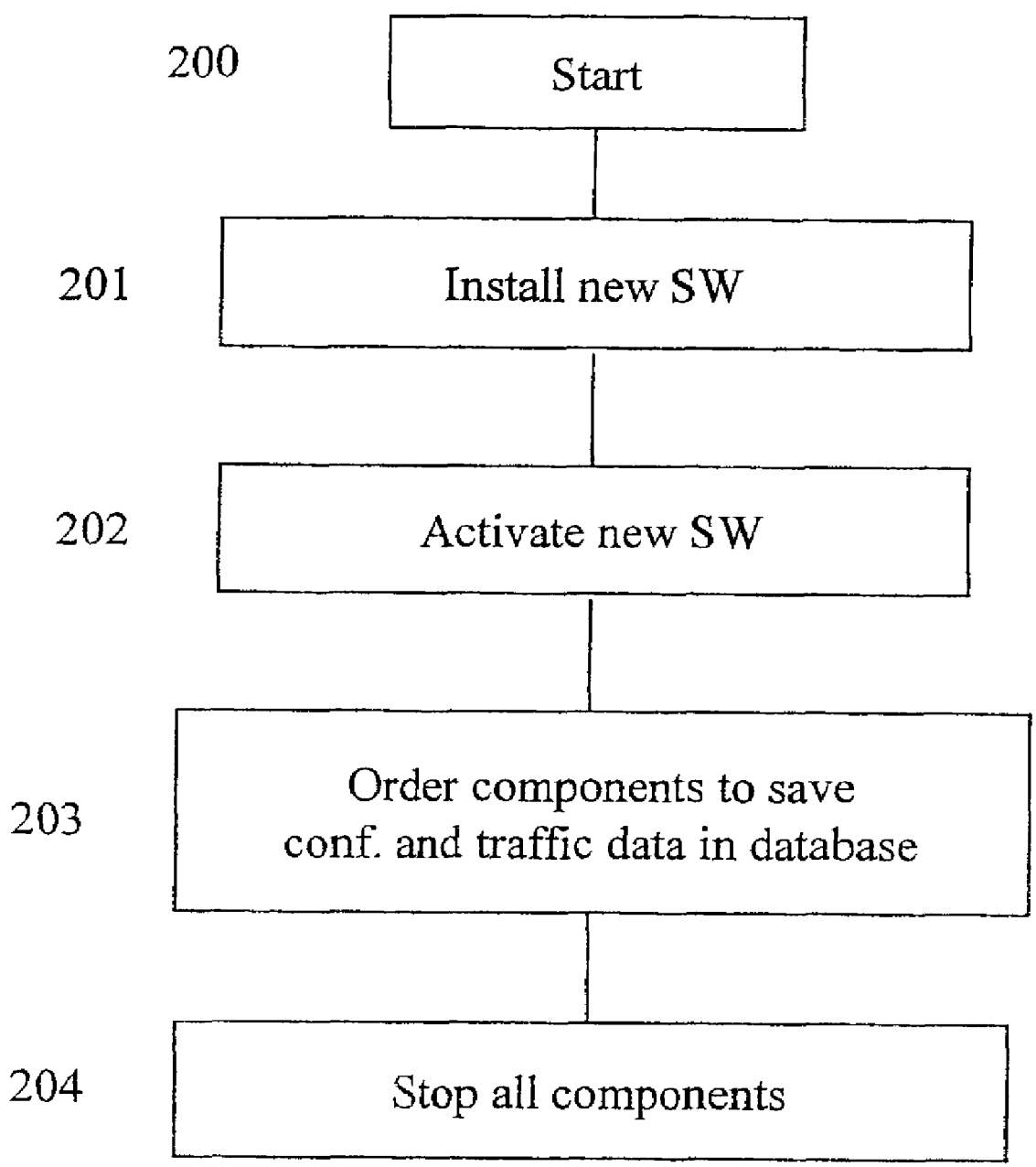
FIG. 2 is a generalised block diagram showing the individual steps performed during the initial preparatory procedure of the inventive method, in which the software system is closed down.

A simplified upgrade scenario will now be described. This scenario involves a preparatory procedure shown in FIG. 2 and a restart procedure shown in FIG. 3. In FIG. 2 the following steps are performed:

Step 201: The Operator installs the new SW version on the node.

Step 202: The Operator activates the new software version.

Step 203: All components save configuration—and traffic—data they want to keep when upgrading.

Step 204: All components are stopped.

This completes the preparatory procedure. Subsequently the operator will start a new procedure in order to restart all components will from the new software version.

Figure 3:
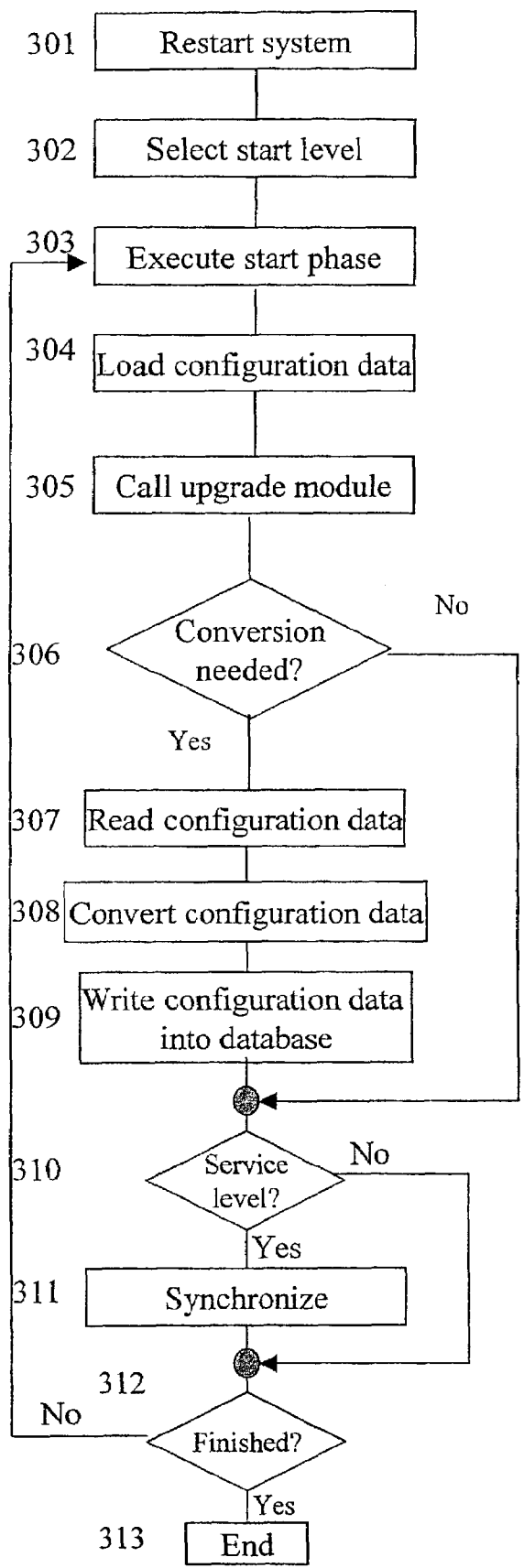
FIG. 3 is a block diagram of the subsequent restart procedure.

Components owning configuration data and/or traffic data are responsible for loading data from the latest committed version (stored in the database) and convert it according to the structure required by the new software version. Configuration—and traffic data are then restored within the new SW version in the database. Note that the old data is not deleted in case there is need to fall back to the previous SC. SC—Software Configuration is the entire SW system containing code and data. FIG. 3 shows how the application in the upgrade case is responsible to bringing configuration data into the new SC.

FIG. 3 shows the individual steps performed when the system is restarted from the new software version (step 301). All processes are started in a start level (start, large restart or small restart) including information about upgrade, step 302. This information is a tuple containing old and new software revisions (each revision is identified by a combination of characters and digits). During the start/restart, all data are normally transformed during the start phases where it naturally belongs.

A module owning data that need converting must do the following actions:
   1. Define a separate module for handling upgrade; for example<module name>_upgrade.
   2. Check on the upgrade information in the start phases where configuration data is loaded. If there is indication on software upgrade, the module loads data from the old SC (step 304) and calls its upgrade module (<module name>_upgrade), step 305.
   3. The upgrade module reads configuration data, converts the data and finally writes it back to the database, steps 307, 308, 309.

This must be done in the appropriate start phases assigned to this kind of process and the specified kind of data. Thus components and processes have the possibility to synchronise the converting task as they did for initiating the data. Upgrading of system is handled as a special case of start or restart.

At this point (step 310), if the start phase is defined as a service level, the software module has to halt the processing and wait until all the other modules have completed their corresponding start phases, i.e. the system is allowed to synchronize, step 311.

The procedure is repetitive; if there are any start phases remaining, the procedure will start over again from step 303.

EXAMPLE

The SGSN is one of the nodes in a GPRS network. The system has several processors and processes that need to be synchronised during start or restart. The "SGSN Start-up" state in turn consists of many sub-states separated by synchronisation points. Executing a number of state phases does transition between sub-states. If a module on a process subscribes to a start phase that is a synchronization point, the start phase is not run until all other processes in the system have completed all start phases up to (not including) the synchronization phase. Even if a process is not subscribing to a start phase with synchronization points, the process will not execute its start phase before all other processes have executed the synchronization points.

Figure 4:
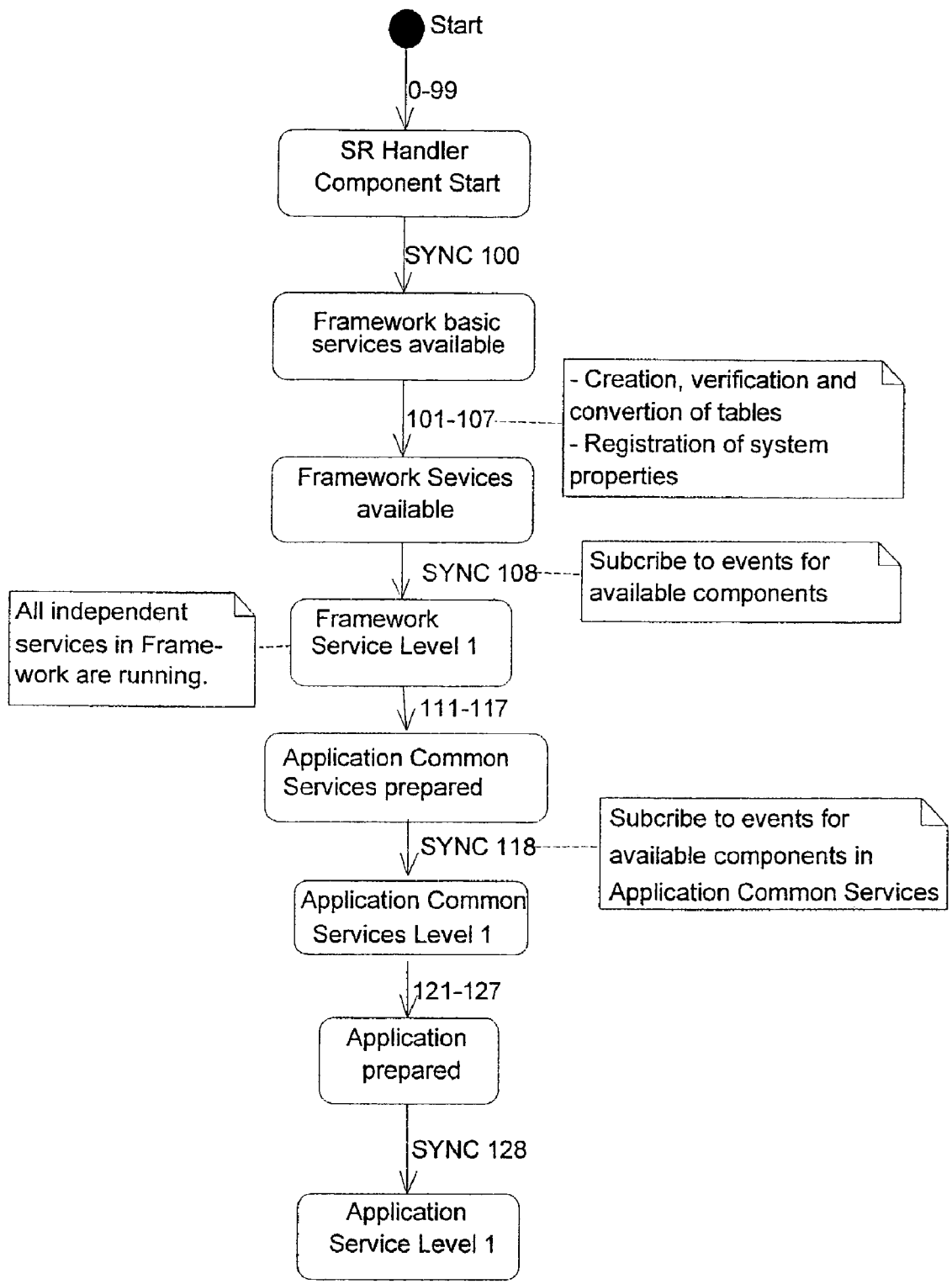
FIG. 4 shows an example of upgrading the SW in a SGSN by the method of the invention.

FIG. 4 shows a number of sub-states during SGSN Start-up and actions that should be done in some of start phases. As the figure shows, a number of sub-states are identified by Service Levels. A Service Level is a concept to help understanding which services are available in a number of specified sub-states.

As an example, converting of configuration data for processes is done during start phases 101–107. Other data is also converted in the start phases assigned for initiating or verification of those data. For example traffic data is converted during 400–499. These start phases are reserved for dynamic workers.

During execution of start phases after Service Level 1 and before Service Layer 2, dependencies between components in all layers are resolved and components continue their start or restart with connecting resources and finally getting ready for the operational state. Several synchronisation points are defined later as well.

Code Example

When the operator initiates an upgrade, the centralised start functionality receives a start with given reason upgrade from the operator and sets an upgrade flag. All modules check whether the flag is set in the relevant start level and start phases. The upgrade activities are executed during the actual start phases. The following pseudo code exemplifies the solution:

Part of the Centralised Start Logic:
% Function start(StartReason, OldRev, OldSc, NewRev, NewSc)
start(StartReason, OldRev, OldSc, NewRev, NewSc)→
  case StartReason of
    upgrades→
      application:start_restart(start, upgrade, OldRev, OldSc, NewRev, New Sc)
    starts→
      application:start_restart(start, start OldRev, OldSc, NewRev, New Sc)
  endcase Part of Applications Start Logic:
% Function start_restart(StartLevel, StartReason, OldRev, OldSc, NewRev, NewSc)
start_restart(StartLevel, StartReason, OldSc, OldRev, NewRev, NewSc)→
  case StartReason of
    upgrades→
      Config=get_config_data(OldSC) upgrade:upgrading (Config, OldRev, NewRev)
      performe_start(StartLevel, NewSc)
    starts→
      performe_start(StartLevel, OldSc)
  endcase Advantages Software upgrade is handled as a special case of restarting the system and uses the same mechanisms for synchronisation. The main advantages are:

Objects handle their own data.

There is no need for centralised functionality with detailed knowledge of all applications and what converting is needed in the current upgrade.

When loading traffic data from the old SC also re-establish of traffic is possible.

Decreased cost of an upgrade and simplified usage.

Less downtime since the start mechanism is optimised for the system.

| Abbreviation list | |
|---|---|
| DBMS | Data Base Management System |
| GGSN | Gateway GPRS Support Node |
| GPRS | General Packet Radio Service |
| SC | Software Configuration. Includes both SW and Data |
| SGSN | Serving GPRS Support Node |
| WPP | Wireless Packet Platform |

APPENDIX

Code Examples from GPRS

Part of a module owning configuration data

```
start_restart(L, 122, RestartLevel, StartArgs) ->
    %% Define behaviour for MS device at CM restart.
    %% Possible values are:
    %% 'release_connections_for_all_devices',
    %% 'release_active_connections_for_all_devices' or
    %% 'success_for_all_devices'.
    %%-------------------------------------------------------------------------------%%
    %% This Case checks if there is a SW upgrade.    %%
    %% Please comment out 'ok;' and use suggested functions, %%
    %% if there is a SW Upgrade case which influence this unit %%
    %%-------------------------------------------------------------------------------%%
    case StartArgs#ncsT_startArgs.upgradeInfo of
        UpgradeInfo when record(UpgradeInfo,ncsT_upgradeInfo),
                UpgradeInfo#ncsT_upgradeInfo.swUpgrade == true->
            mmtms_upgrade:upgrading(UpgradeInfo);    %/upg
    case do data struct converting
        _->
            ok
    end,
    ncs_OamRT:set_default_sysprop(void,mmtms_disconnect_action,
            release_active_connections_for_all_devices),
    {{continue,close_queue},L};
```

APPENDIX-continued

Code Examples from GPRS

Part of the module responsible for converting data

```
-module(mmtms_upgrade).
%%%
%%% Description:
%%% upgrade and converting module
%%%
%%%
=========================================================================
%%%----------------------------------------------------------------------
%%% #2.1.3 FUNCTIONS EXPORTED OUT OF UNIT
%%%----------------------------------------------------------------------
-export([upgrading/1]).
%%#BEGIN definitions
-define(module_type, nontree_module).
-define(static_proc, true).
-define(sysfunc_vsn_002, true).
%%%#END definitions
%%%----------------------------------------------------------------------
%%% #4    APPLICATION FUNCTIONS
%%%----------------------------------------------------------------------
%%%
%%% - - - - - - - - - - - - - - - - - - - - - - - - - - - - - - - - - - -
%%% Function   : upgrading(UpgradeInfo)->
%%%                ServerRet
%%%
%%% Types      : UpgradeInfo = ncsT_upgradeInfo, All needed info for conversion
%%%
%%% Description:
%%% - - - - - - - - - - - - - - - - - - - - - - - - - - - - - - - - - - -
%%%
upgrading(UpgradeInfo)-> %% run the upgrade case
   OldSC=UpgradeInfo#ncsT_upgradeInfo.previousSC,
   FromRev=UpgradeInfo#ncsT_upgradeInfo.previousRevision,
   ToRev=UpgradeInfo#ncsT_upgradeInfo.currentRevision,
   %/ You have to update "converting_needed" when convering is needed
   case converting_needed(FromRev, ToRev) of
      true ->
         convert(UpgradeInfo);
      false ->
         ok
   end.
%%%----------------------------------------------------------------------
%%% converting_needed(FromRev,ToRev)
%%% boolen function test if converting is needed.
%%% FromRev String Revision of the old SW configuration
%%% ToRev  String Revision of the new SW configuration
%%% Return value: true | false
%%% This function must be updated if converting is needed for a
%%% particular upgrade case. The Revision is per DPE-application,
%%% and you need to know the old and new revision of the DPE-application
%%% this module is a part of.
%%% %/upg
converting_needed("R1A01", "R3A01")->
   true;
converting_needed("R1A02", "R3A01")->
   true;
converting_needed(_, _) ->
   false.
%%%----------------------------------------------------------------------
%%% convert(UpgradeInfo)
%%% This function do the converting to new data structure
%%% For the time being no converting is needed for this unit
convert(UpgradeInfo)->
   %% START ETOtr
   %% This is a TR, it should have been part of GSN2.x & GSN3.0
   %% Since the operator might have swapped to GSN3.0 before
   %% applying a patch-level containing ETOtr06701 this
   %% upgrade step is done, forcing new nodePrope value.
   %% Since mmtms_c_v1.hrl done exist the values below is
   %% hardcoded instead of imported from a .hrl file.
   NodePropIdPq    = "Pq_MaxQueueSize",
   NodePropValuePq = 16,
   ncs_cOamNpOwner:node_prop_write(void,NodePropIdPq,NodePropValuePq),
%% END ETOtr
%% START ETOtr
%% This is a TR, it should have been part of GSN2.x & GSN3.0
```

APPENDIX-continued

Code Examples from GPRS

```
%% Since the operator might have swapped to GSN3.0 before
%% applying a patch-level containing ETOtr this
%% upgrade step is done.
%% Since mmtms_c_v1.hrl done exist the values below is
%% hardcoded instead of imported from a .hrl file.
NodePropIdPag   = "Repeat_paging",
NodePropValuePag = 0,
    ncs_cOamNpOwner:node_prop_write(void,NodePropIdPag,NodePropValuePag),
%% END ETOtr
ok.
%%%========================================================================
%%% #5   ADMINISTRATIVE INFORMATION
%%%========================================================================
%%%------------------------------------------------------------------------
%%% Template Id: 112/1013-1/FCP 103 1113 Rev PA17
%%%------------------------------------------------------------------------
%%%
%%% #Copyright (C) 2000
%%% by ERICSSON TELECOM AB
%%% S - 125 26 STOCKHOLM
%%% SWEDEN, tel int + 46 8 719 0000
%%%
%%% The program may be used and/or copied only with the written
%%% permission from ERICSSON TELECOM AB, or in accordance with
%%% the terms and conditions stipulated in the agreement/contract
%%% under which the program has been supplied.
%%%
%%% All rights reserved
%%%
```

What is claimed is:

1. A method for upgrading software in a system comprising several application modules running in parallel, one or more of the modules holding configuration data and transaction data which must survive the upgrade operation, comprising the steps of:
 a) installing and activating new software on the system,
 b) ordering all modules to save their configuration and transaction data to a database,
 c) stopping all modules
 d) restarting all modules from the new software version,
 e) any module which need to convert the configuration and transaction data in order to comply with the new software version, loading said data from the database and defining an upgrade module, and
 f) said upgrade module will read said data, convert the data into the required format, and save the converted data by writing the converted data back into said database.

2. The method as claimed in claim 1, wherein said step c) further comprises the steps of:
 c1) selecting a start level defining the number of application modules that are concerned by the upgrade, each start level comprising a number of start phases defining activities;
 c2) allocating a number of start phases to each application module; and
 c3) executing the start phases seguentially for each application module.

3. The method as claimed in claim 2, wherein some of the start phases are defined as synchronization points, and on arriving on such a phase, each application module being arranged to temporarily stop the execution of the phase until all application modules have reached the same phase.

4. A system for processing data tangibly embodied on a computer readable medium comprising a number of application modules running in parallel, the system comprising:
 a number of start levels each defining the extent of a start or restart procedure,
 each start level including a number of start phases each defining an activity,
 each application module subscribing to a number of start phases of each start level,
 a database holding configuration and transaction data for one or more of the application modules, and
 an upgrade module associated with each application module, said upgrade module being adapted to read configuration and transaction data from said database, convert the data and write the data back into the database.

5. The system as claimed in claim 4, wherein some of said start phases are defined as synchronization points, and on arriving on such a phase, each application module being arranged to temporarily stop the execution of the phase until all application modules have reached the same phase.

6. The system as claimed in claim 4, further comprising:
 means for selecting a start level defining the number of application modules that are concerned by the upgrade, each start level comprising a number of start phases defining activities;
 means for allocating a number of start phases to each application module; and
 means for executing the start phases sequentially for each application module.

* * * * *

UNITED STATES PATENT AND TRADEMARK OFFICE
CERTIFICATE OF CORRECTION

PATENT NO. : 7,089,550 B2 Page 1 of 1
APPLICATION NO. : 10/369870
DATED : August 8, 2006
INVENTOR(S) : Bakke et al.

It is certified that error appears in the above-identified patent and that said Letters Patent is hereby corrected as shown below:

In Column 7, Line 37, delete "convering" and insert -- converting --, therefor.

In Column 9, Line 40, in Claim 1(c), after "modules" insert -- , --.

In Column 9, Line 58, in Claim 2, delete "seguentially" and insert -- sequentially --, therefor.

Signed and Sealed this

Eighteenth Day of December, 2007

JON W. DUDAS
*Director of the United States Patent and Trademark Office*